United States Patent [19]

Sato et al.

[11] Patent Number: 4,520,625
[45] Date of Patent: Jun. 4, 1985

[54] HYDRAULIC BRAKE VALVE SYSTEM

[75] Inventors: Hideyori Sato, Funabashi; Nobuaki Inaba, Yokohama; Mitsuru Arai, Kamakura; Michio Onzou, Kawasaki, all of Japan

[73] Assignee: Kabushiki Kaisha Komatsu Seisakusho, Tokyo, Japan

[21] Appl. No.: 471,341

[22] Filed: Mar. 2, 1983

[30] Foreign Application Priority Data

Mar. 4, 1982 [JP] Japan ............................... 57-029613
Mar. 4, 1982 [JP] Japan ............................... 57-029614

[51] Int. Cl.³ ............................................ F16D 31/02
[52] U.S. Cl. ....................................... 60/464; 60/468; 60/494
[58] Field of Search ............................ 60/464, 468, 494; 91/451, 468

[56] References Cited

U.S. PATENT DOCUMENTS

| | | | |
|---|---|---|---|
| 3,636,708 | 1/1972 | Karman et al. | 60/464 |
| 3,948,146 | 4/1976 | Maurer et al. | 60/468 |
| 4,362,018 | 12/1982 | Torii | 60/468 |

FOREIGN PATENT DOCUMENTS

| | | | |
|---|---|---|---|
| 71760 | 6/1978 | Japan | 60/494 |
| 56-103359 | 8/1981 | Japan . | |
| 179407 | 11/1982 | Japan | 91/451 |
| WO82/02229 | 7/1982 | PCT Int'l Appl. | 91/451 |

Primary Examiner—Sheldon J. Richter
Assistant Examiner—Randolph A. Smith
Attorney, Agent, or Firm—Armstrong, Nikaido, Marmelstein & Kubovcik

[57] ABSTRACT

A hydraulic brake valve system for use in a hydraulic circuit consisting of driving and braking fluid lines and including therein at least a hydraulic motor for the actuation of an inertia body such as, for example, a construction vehicle or work implements thereof has a counterbalance valve, a cross-over safety valve, a drain change-over valve and a timer valve. The cross-over safety valve consists of two common relief valves, each having two pressure receiving surfaces and adapted to relieve pressurized fluid acted on one of the pressure receiving surfaces at a low pressure and relieve pressurized fluid acted on the other pressure receiving surface at a high pressure, wherein the first port of one of said relief valves is connected with said driving fluid line and the second port thereof is connected with said braking fluid line, whilst the first port of the other relief valve is connected with said braking fluid line and the second port thereof is connected with said driving fluid line.

2 Claims, 10 Drawing Figures

HYDRAULIC BRAKE VALVE SYSTEM

BACKGROUND OF THE INVENTION

1. Field of the Invention

This invention relates to a hydraulic brake valve system for use in a hydraulic circuit including at least one hydraulic motor for the actuation of an inertia body such as, for example, a starting operation, a braking operation, etc., of a construction vehicle.

The brake valve system of the kind specified which has so far been employed comprises a counterbalance valve installed in a hydraulic fluid circuit connecting a hydraulic motor with a manually operated directional control valve connected to a pressurized fluid supply source, and a cross-over safety valve comprised of two relief valves installed in parallel between the counterbalance valve and the hydraulic motor, the arrangement being made such that, when the manually operated directional control valve is manipulated to change over the counterbalance valve, the pressurized fluid from the pressurized fluid supply source will circulate in either direction from a driving (or normal running) fluid line to a braking (or reverse running) fluid line of the hydraulic fluid circuit or from the braking line to the driving one thereby driving or braking the inertia body connected to the hydraulic motor. Both the magnitude of acceleration of the inertia body at the time when starting and the magnitude of the braking force to be applied to the inertia body when the manually operated directional control valve is manipulated so as to change over the counterbalance valve depend on the set pressure for the above-mentioned two relief valves constituting a cross-over safety valve. The set pressure will increase as the weight of the inertia body increases. For this reason, the hydraulic fluid circuit employing the conventional brake valve system has been disadvantageous in that when starting, ending acceleration of, commencing deceleration of, stopping, etc., a large inertia body like a construction vehicle such as, for example, a hydraulic shovel, a hydraulic crane, etc., the fluid pressure discharged by the hydraulic pump will increase suddenly by the inertia of the inertia body and a high acceleration or deceleration energy is transmitted to the hydraulic motor thus causing an abnormally large shock in a machine having a large mechanical backlash such as, for example, gears, etc. In obsevation of the waveform of the fluid pressure in the circuit, at the time when starting the inertia body, a sharply rising peak pressure will occur in the driving fluid line of the hydraulic fluid circuit, whilst in case of ending acceleration of the inertia body and when commencing deceleration thereof or stopping it, a sharply rising peak pressure will occur in the braking fluid line of the circuit. It is envisaged that the generation of such sharply rising peak pressures forms one of the causes of the shock. The generation of such a peak pressure is due to the fact that the cross-over safety valve which have so far been employed in the hydraulic fluid circuit of this kind can give such an operating function as providing a set pressure rising at only one stage so that the fluid pressure is varied quickly from a low pressure to a high pressure. To cope with this, it is envisaged to increase the set pressure in two stages. To achieve the purpose, however, it is necessary in the conventional arrangement to vary the fitting length of the spring for regulating the set pressure and to provide a movable part thus making the construction of the arrangement complicated and increasing the cost thereof.

One embodiment of the hydraulic brake valve system wherein the set pressure can be increased in two stages is disclosed in the Laid-open Publication No. Sho 56-103359 of Japanese Utility Model application published on Aug. 13, 1981 in Japan. According to this prior art, the conventional crossover safety valve is replaced with two relief valves 16 and 17 mounted in hydraulic conduits 8 and 9, respectively, to which branch conduits respectively branched from the conduits 9 and 8 are connected as their respective primary passages 14 and 15. These relief valves 16 and 17 form a hydraulic brake valve system in association with a counterbalancing valve 5. Each of the relief valves 16, 17 is constructed such that a poppet 19 located oppositely to the primary passages 14 or 15 is urged by a spring 20 to a valve seat 18. The poppet 19 is formed with a rod chamber 22 in which is inserted one end of a rod 21 having a sectional area $S_2$ smaller than the sectional area $S_1$ of the seat and a restricted passage 23 defined to commuicate the rod chamber 22 with the primary passages. The other end of the rod 21 is inserted into a spring chamber 24 and is urged against the poppet 19 by the force of a spring 26 interposed between the rod 21 and a spring retaining surface 25 of the spring chamber 24. In addition, the rod 21 has a small protrusion 27 formed at the other end thereof and which serves to set the maximum amount of movement of the rod in co-operation with the spring retaining surface 25. The spring 26 has, of course, a spring constant smaller than that of the spring 20. Therefore, the spring 26 is relatively weak in its biasing force. Obviously, in this prior art, a movable part such as, for example, the rod 21 is located in the relief valve in addition to the poppet. To set a certain set pressure, it is required to adjust the biasing forces of the two springs 20 and 26. Therefore, the construction of the brake valve system becomes complicated thereby increasing the cost thereof. Further, in the above-mentioned prior art embodiment, the stroke of the rod 21 is set to be comparatively long, and so the response thereof to a sudden variation in the fluid pressure is not rapid. Further, because the set pressure is set in two stages in each of the relief valves, the stablity of valve functions at the time when the valves are changed-over is unsatisfactory.

SUMMARY OF THE INVENTION

The present invention has been contemplated in view of the foregoing and has its object to provide a hydraulic brake valve system arranged so that the pressure rise generating in a driving fluid line or a braking fluid line of a hydraulic fluid circuit at the time when starting, ending acceleration of, commencing deceleration of, stopping, etc. an inertia body can be increased in two stages so as to prevent the sudden pressure rise thereby reducing the shock arising from sharp pressure rises in the hydraulic fluid circuit.

Another object of the present invention is to provide a relief valve without a movable part for varying the set pressure for relief which enables to set either the high pressure relief condition or the low pressure relief condition to be made depending on which port is subjected to the fluid pressure, that is, on the fluid pressure supply condition.

A further object of the present invention is to provide a cross-over safety valve wherein the above-mentioned two relief valves are employed such that a first port of one of said relief valves is connnected with the driving fluid line and a second port thereof is connected with the braking fluid line, whilst a first port of the other relief valve is connected with the braking line and the second port thereof is connected with the driving line.

To achieve the above-mentioned objects, in accordance with the present invention, there is provided a hydraulic brake valve system installed in a hydraulic fluid circuit wherein a hydraulic motor is connected with a manually operated directional control valve through a driving fluid line of the circuit and a braking fluid line thereof, characterized in that the system comprises a counterbalance valve; a first relief valve having two pressure receiving surfaces therearound and adapted to relieve the pressurized fluid acted on one of the pressure receiving surfaces at a low pressure and to relieve the pressurized fluid acted on the other of the pressure receiving surfaces at a high pressure, the first relief valve having a back pressure chamber to block the relieving operation and arranged to connect the pressure receiving surface on the low pressure side with the driving fluid line and to connect the pressure receiving surface on the high pressure side with the braking fluid line; a second relief valve having the same construction as that of the first relief valve and arranged to connect the pressure receiving surface on the low pressure side with the braking fluid line and to connect the pressure receiving surface on the high pressure side with the driving fluid line; a drain change-over valve adapted to be actuated by the pressure differential between the driving fluid line and the braking fluid line and also arranged to connect either one of the fluid lines which is kept at a low pressure with a drain passage; and a timer valve adapted to be actuated by the pressure differential between the driving fluid line and the braking fluid line and arranged to supply with a time lag the pressurized fluid within either one of the fluid lines which is kept at a high pressure into the back pressure chamber of the relief valve whose pressure receiving surface on the low pressure side is connected with the fluid line kept at a high pressure.

Further, the above-mentioned first and second relief valves are characterized in that each of them comprises a valve seat member having an axially extending bore communicating with a first port; a poppet having a diameter larger than that of the seat of said valve seat member, the end face of the outside diameter portion of said poppet being located oppositely to a second port; and a spring located to urge said poppet from the rear surface thereof towards said valve seat member, the arrangement being made such that if the area of the poppet to receive the pressurized fluid from the first port is defined as $A_1$ and that of the poppet to receive the pressurized fluid from the second port as $A_2$, then a relationship of $A_1 < A_2$ is obtained, and that the rear surface of the poppet being located oppositely to a third port.

DETAILED DESCRIPTION OF THE PREFERRED EMBODIMENT

Figure 1:
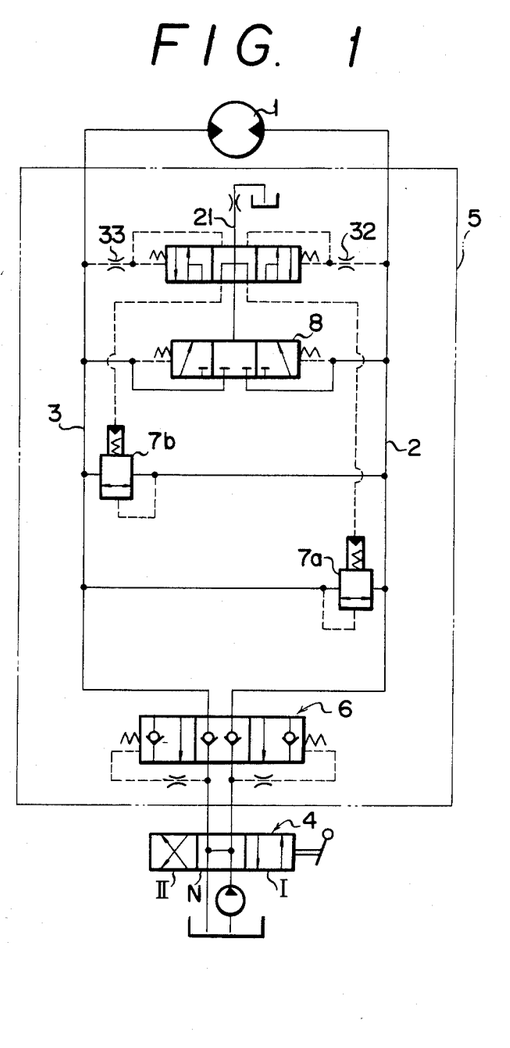
FIG. 1 is a schematic hydraulic fluid circuit diagram of one embodiment of the hydraulic brake valve system according to the present invention.

With reference to FIG. 1, reference numeral 1 denotes a hydraulic motor connected to an inertia body and adapted to turn or run it, and reference numerals 2 and 3 indicate a driving (or normal running) fluid line for the hydraulic motor 1 and a braking (or reverse running) fluid line therefor. Within both the above-mentioned fluid lines 2 and 3, a brake valve system 5 is interposed between the hydraulic motor 1 and a manually operated directional control valve 4. This brake valve system 5 is provided with a counterbalance valve 6; two relief valves, that is, first and second relief valves 7a and 7b; a drain change-over valve 8; and a timer valve 9. The above-mentioned counterbalance valve 6 is of the commonly used type. Both the first and second relief valves 7a and 7b are identical in their construction and disposed oppositely to and in parallel with each other.

Figure 2:
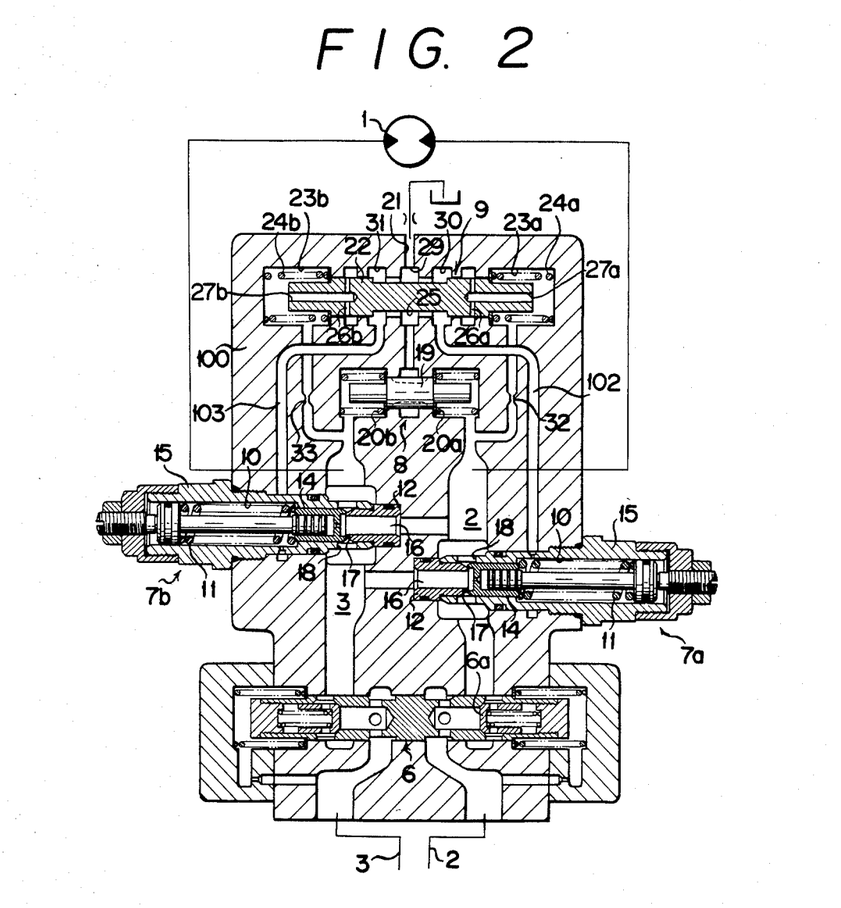
FIG. 2 is a sectional view of one embodiment of the hydraulic brake valve system according to the present invention.

The concrete arrangement of the above-mentioned first and second relief valves 7a, 7b, the drain change-over valve 8 and the timer valve 9 will be described below with reference to FIGS. 2 and 3.

Each of the first and second relief valves 7a and 7b comprises a back pressure chamber 10, a spring 11 mounted in the back pressure chamber 10, a valve seat member 12, a poppet 14 located oppositely to the valve seat member 12 and biased by the spring 11, the leading end of the poppet 14 abutting against a valve seat 12a, and a sleeve 15 forming the back pressure chamber 10 and guiding the poppet 14. The pressure receiving surface formed in the leading end of the poppet is located oppositely to a first port communicating with an axially extending bore 16 of the valve seat member 12. Further, the poppet 14 has a pressure receiving surface 17 formed in the outer periphery thereof so as to counterbalance the biasing force of the spring 11. Further, the sleeve 15 has a communicating hole or a second port 18 formed therein and adapted to communicate the pressure receiving surface 17 of the poppet 14 and a fluid line located outside thereof.

The area of the above-mentioned pressure receiving surface 17 is larger than that of the pressure receiving surface formed on the leading end opposite to the axially extending bore 16.

The above-mentioned first relief valve 7a is so arranged or built up that the communication hole 18 of the sleeve 15 communicates with the normal running fluid line 2, whilst the axially extending bore 16 of the valve seat member 12 leads to the reverse running fluid line 3. Further, the another relief valve 7b is so arranged that the communication hole 18 of the sleeve 15 communicates with the reverse running fluid line 3, whilst the axially extending bore 16 of the valve seat member 12 communicates with the normal running fluid line 2.

The drain change-over valve 8 is connected between the fluid lines 2 and 3 and comprises a spool 19 and springs 20a and 20b mounted on both sides of the spool 19. The drain change-over valve 8 is adapted to be closed when the pressures in both fluid lines 2 and 3 are in equilibrium and is arranged such that when the pressure in either one of the fluid lines 2 and 3 is larger than the other the spool 19 is moved against the baising force of either one of springs 20a and 20b so as to allow the fluid line whose internal pressure is lower to communicate with a drain passage 21.

The timer valve 9 comprises a spool 22, first and second pressure chambers 23a and 23b defined on both sides of the spool 22 and springs 24a and 24b mounted within the first and second chambers 23a and 23b so as to bias the spool 22 to its neutral position. Further, the spool 22 has a reduced diameter portion 25 formed in the intermediate part thereof and also set pressure passages or axially extending bores 27a and 27b formed to connect the pressure chambers 23a and 23b with first and second openings 26a and 26b, respectively, which are defined on theouter periphery of the spool 22. Whilst, the valve body 100 in which a spool 22 is slidably mounted has formed therein a drain port 29 and first and second ports 30 and 31 located on both sides of the drain port 29. The first port 30 communicates through a communication passage 102 connected to the third port of the relief valve 7a with the back pressure chamber 10 of the first relief valve 7a, the second port 31 communicates through a communication passage 103 connected to the third port of the second relief valve 7b with the back pressure chamber 10 of the second relief valve 7b. Further, the first and second pressure chambers 23a and 23b of the timer valve 9 communicate through restricted passages 32 and 33 with the normal running fluid line 2 and the reverse running fluid line 3, respectively. The first and second openings 26a and 26b are so arranged that when the spool 22 is urged to its stroke end by the biasing force of the spring 24a within the first chamber 23a the first opening 26a may communicate with the first port 30 and when the spool 22 is moved to its opposite stroke end the second opening 26b may communicate with the second port 31.

The detailed construction of the above-mentioned relief valve 7a will now be described below with reference to the enlarged view of FIG. 3. The relief valve 7b is identical in its construction with the relief valve 7a, and so the detailed description of it is omitted herein.

Figure 3:
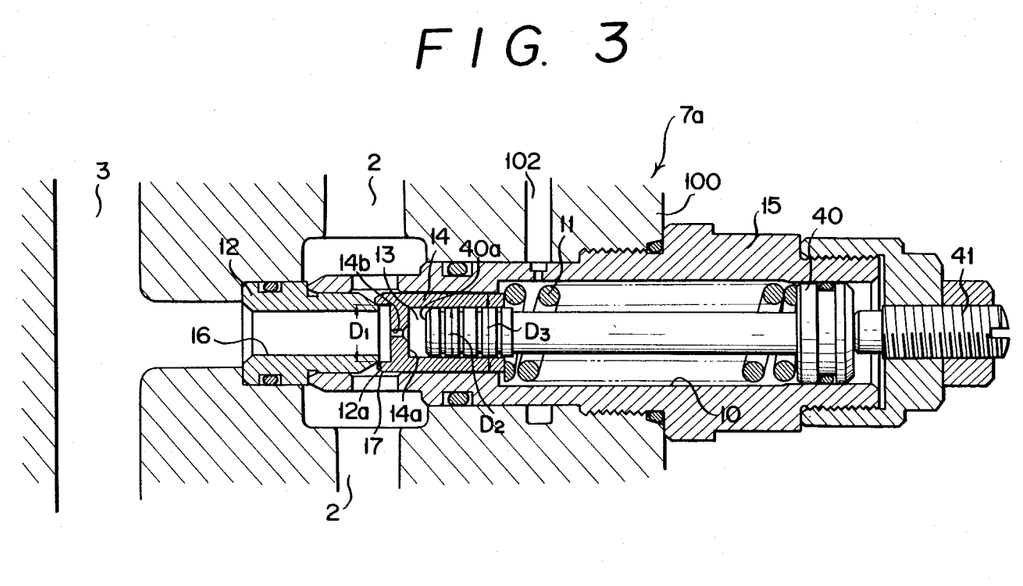
FIG. 3 is an enlarged sectional view of a relief valve employed in the hydraulic brake valve system of the present invention.

In FIG. 3, reference numeral 100 denotes a valve body, 15 a sleeve fixedly secured to the valve body, and 12 a valve seat member which abuts against the leading end of the sleeve 15 and which is fixedly secured to the valve body 100. A poppet 14 is slidably mounted within the sleeve 15 and opposite to the valve seat member 12. Reference numeral 11 denotes a spring for biasing the poppet 14 towards the valve seat 12, the spring 11 being carried by a piston 40 whose biasing force can be adjusted by shifting its position by means of a screw-threaded rod 41. The rear surface 14a of the poppet 14 is located opposite to the inside of the sleeve 15. Defined between the rear surface 14a and the leading face 40a of the piston 40 is a back pressure chamber 13 which is formed independently of the inside of the sleeve 13 and which is allowed to communicate through a restricted passage 14b with the side of the valve seat member 12.

If the diameter of the seat portion 12a of the valve seat member 12 which comes in contact with the poppet 14 is defined as $D_1$, the diameter of the back pressure chamber as $D_2$, and the outside diameter of the poppet 14 as $D_3$, a relationship of $D_3 > D_1 > D_2$ is defined and the difference between $D_1$ and $D_2$ is smaller than that between $D_3$ and $D_1$. Further, the axially extending bore 16 of the valve seat member 12 is allowed to communicate with the normal running fluid line 2, and the outside diameter portion at the leading end of the poppet 14 is allowed to communicate through the communication hole 18 with the reverse running fluid line 3, and the rear surface of the poppet 14 within the sleeve 15 is allowed to communicate with the communication passage 102.

The area $A_1$ of the poppet 14 adapted to be subjected to the fluid pressure supplied by way of the normal running fluid line 2 is given by following formula.

$$A_1 = \pi/4(D_1^2 - D_2^2)$$

Further, the area $A_2$ of the poppet 14 adapted to be subjected to the fluid pressure supplied by way of the reverse fluid line 3 is expressed by the following formula.

$$A_2 = \pi/4(D_3^2 - D_1^2)$$

Therefore, taking into consideration the relationship of $D_3 > D_1 > D_2$, a relationship of $A_1 < A_2$ can be obtained.

In the above-mentioned arrangement, comparison between the case where pressurized fluid is supplied from the source thereof into the normal running fluid line 2 and the case where pressurized fluid is supplied into the reverse running fluid line 3 is discussed below. If the pressurized fluid is supplied into the normal running fluid line 2, because of the relationship of $A_1 < A_2$, the relief pressure to the side of the normal running fluid line 2 is set higher than that to the side of the reverse running fluid line 3. Whilst, in the case the pressurized fluid is supplied into the reverse running fluid line 3, the relief pressure to the side of the reverse running fluid line 3 is set higher than that to the side of the normal running fluid line 2. Further, when the pressurized fluid is supplied into the communication passage connected to the back pressure chamber 10, the poppet 14 is locked in the sleeve 15 and is blocked from the fluid pressure from the normal running fluid line 2 and the reverse running fluid line 3.

As mentioned hereinabove, the hydraulic brake valve system according to the present invention constitutes a cross-over safety valve wherein two relief valves are employed, the first port of one of the relief valves is allowed to communicate with the normal running (or driving) fluid line 2 and the second port thereof is allowed to communicate with the reverse running (braking) fluid line 3, whilst the first port of the other one of the relief valves is allowed to communicate with the reverse running fluid line 3 and the second port thereof is allowed to communicate with the normal running fluid line 2.

The operation of the hydraulic brake valve system of the present invention thus constructed will be described below with reference to FIG. 2 and FIGS. 4 to 8.

(1) AT NEUTRAL POSITION (FIG. 2):

Both the normal running fluid line 2 and the reverse running fluid line 3 are connected to the drain passage, and so the counterbalance valve 6 is held at its neutral position by the force of springs. Further, both the first and second relief valves 7a and 7b are closed by the force of the spring 11, respectively.

Figure 4:
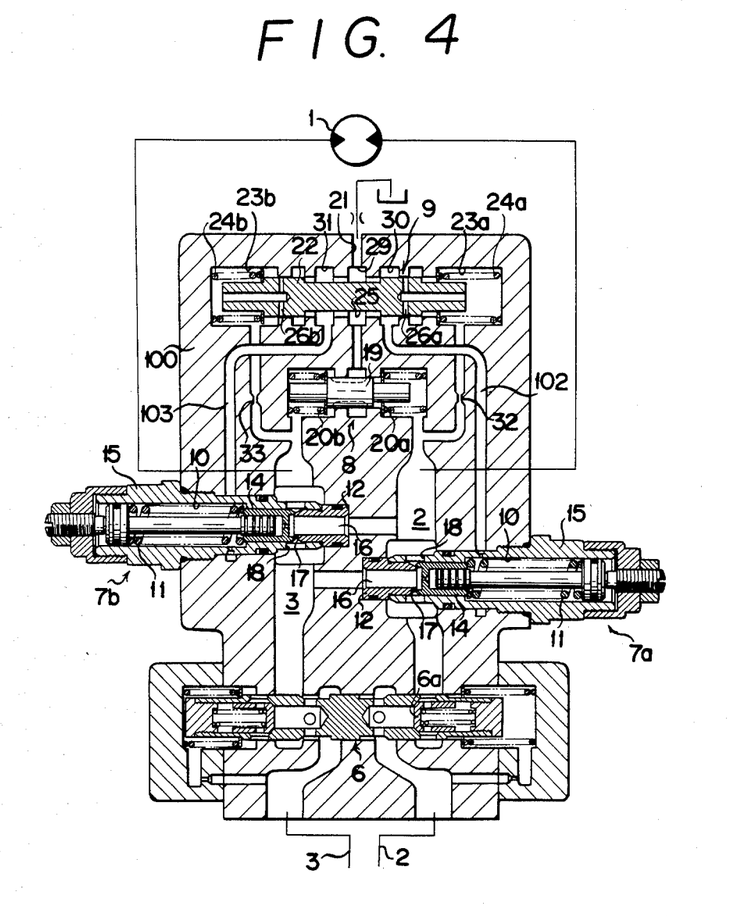
FIGS. 4 to 8 are sectional views for explaining the operation of the hydraulic brake valve system of the present invention.

(2) UNDER NORMAL RUNNING CONDITION—SET AT A LOW PRESSURE RELIEF CONDITION (FIG. 4):

When the manually operated directional control valve 4 is switched over to its position I so as to supply the pressurized fluid from the hydraulic pump into the normal running (or driving) fluid line 2, the pressurized fluid will flow through a check valve 6a of the counterbalance valve 6 into the circuit 2 so as to increase the pressure in the normal running inlet port (or fluid line 2) to develop a starting torque to thereby enable the hydraulic motor 1 to commence its rotation. At that time, the pressurized fluid within the normal running fluid line 2 is also supplied into the drain change-over valve 8 to change over it thereby draining the fluid in the reverse running fluid line 3. At the same time, the pressurized fluid within the normal running fluid line 2 will flow through the restricted passage 32 into the first pressure chamber 23a of the timer valve 9 thereby moving the spool 22 to the left. The movement of the spool 22 which occurs at that time is delayed due to the fact that the fluid pressure within the second pressure chamber 23b on the left side is restricted by the restricted passage 33 and so it takes a time of $\Delta t$ until the spool 22 reaches its stroke end. Further, at that time, the back pressure chamber 10 of the first relief valve 7a is connected through the timer valve 9 to the drain passage 21 before the spool 22 of the timer valve 9 moves to its stroke end. Therefore, the poppet 14 of the first relief valve 7a is set at a low pressure relief condition. For this reason, the pressurized fluid from the normal running fluid line 2 which is kept at a low pressure and which is acted on the pressure receiving surface 17 of the poppet 14 will flow through the poppet 14, the valve seat 12a and the axially extending bore 16 of the valve seat member 12 into the reverse running fluid line 3 and then be drained. Whilst, the fluid pressure within the normal running fluid line 2 is acted on the leading end of the poppet 14 of the second relief valve 7b. Because the area $A_1$ of the leading end face of the poppet 14 is smaller than the area $A_2$ of the pressure receiving face formed in the outer periphery of the poppet 14 in spite of the fact that the back pressure chamber 10 of the second relief valve 7b is drained, it is necessary to supply a pressure higher than that in the fluid line 2 in order to push open the poppet 14 of the second relief valve 7b thereby draining the pressurized fluid. In other words, the second relief valve 7b is set at a high pressure relief condition relative to the first relief valve 7a.

Figure 5:
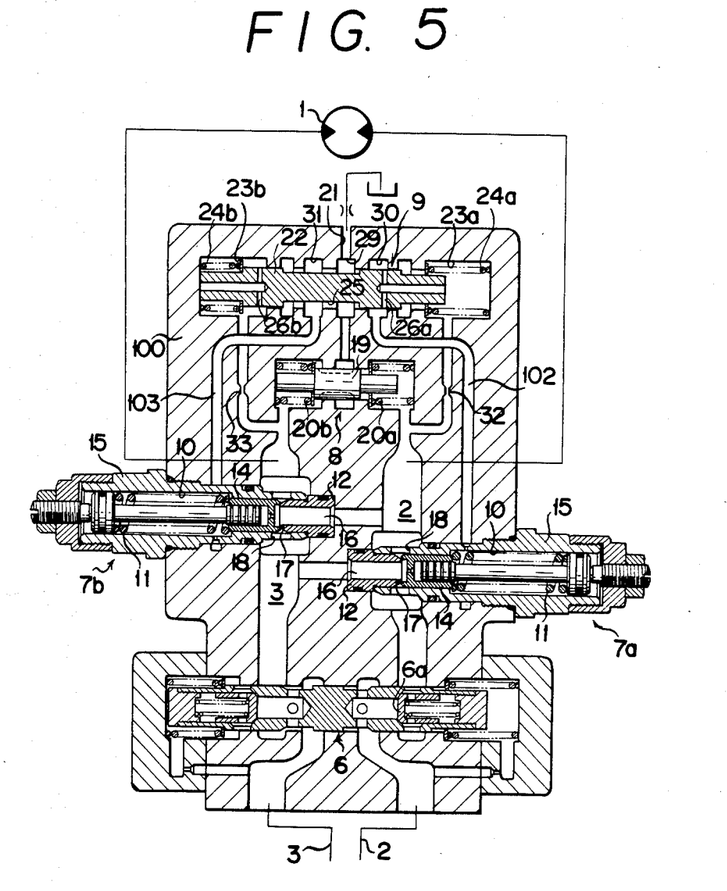

(3) UNDER DRIVING CONDITION—SET AT A HIGH PRESSURE RELIEF CONDITION (FIG. 5):

When the spool 22 of the timer valve 9 moves subsequently to the left hand stroke end, the first opening 26a of the spool 22 is allowed to communicate with the first port 30 of the timer valve 9 so that the pressurized fluid within the fluid line 2 is supplied through the first pressure chamber 23a, the axial bore 27a of the spool 22, the first opening 26a and the first port 30 into the back pressure chamber 10 of the first relief valve 7a. Consequently, the poppet 14 of the first relief valve 7a is blocked thus ceasing its function as a low pressure relief valve, and the pressure within the fluid line 2 (or in the inlet port of the hydraulic motor) will begin to rise again.

When the pressure in the normal running fluid line 2 has increased to a predetermined value, the second relief valve 7b will act as a high pressure relief valve so that the normal running fluid line 2 may be set at a high pressure thereby developing a large torque to be transmitted to the hydraulic motor 1 and enabling the latter to be rotated at its rated speed.

Figure 6:
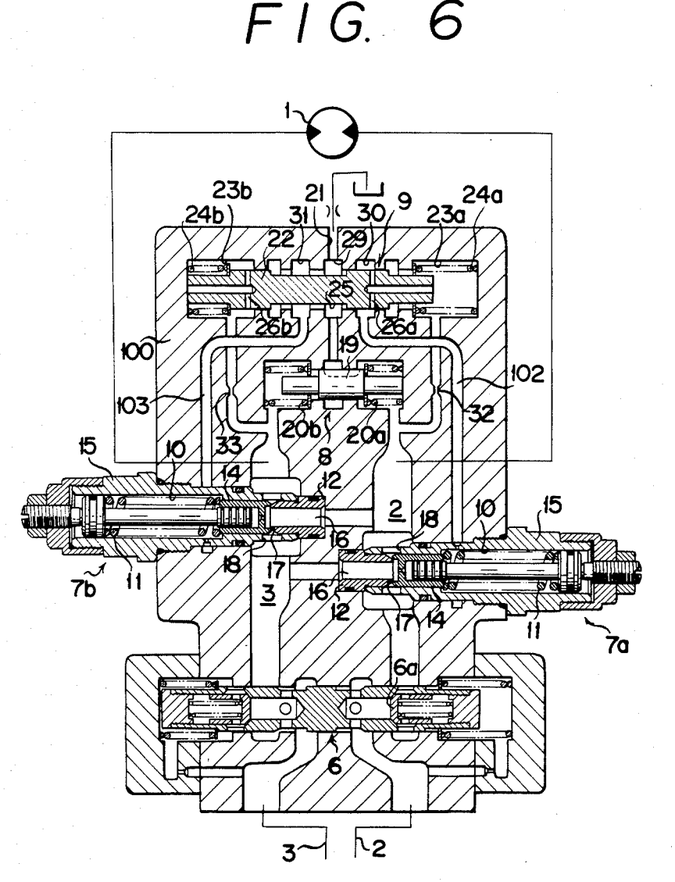

(4) COMMENCEMENT OF BRAKING WITH MANUALLY OPERATED DIRECTIONAL CONTROL VALVE LEVER LOCATED AT ITS NEUTRAL POSITION (FIG. 6):

When the manually operated directional control valve 4 is again moved back to its neutral position N, the pressurized fluid from the hydraulic pump will not be supplied into the normal running fluid line 2. As a result, the counterbalance valve 6 will begin to move back to its neutral position. Then, the pressurized fluid from the outlet port of the hydraulic motor will be drained through the counterbalance valve 6. Because the fluid in the inlet port of the hydraulic motor becomes short of by the amount of the fluid thus drained, the fluid is drawn up through the check valve 6a of the counterbalance valve 6 thereby preventing the generation of cavitation in the hydraulic motor 1.

With the movement of the counterbalancing valve towards its neutral position, the flow rate of the fluid flowing out from the outlet port of the hydraulic motor through the counterbalance valve 6 is restricted so that the rotation of the hydraulic motor by inertia will increase the pressure in the outlet port of the motor. This pressure rise causes a braking action to be applied on the hydraulic motor 1. The pressure rise in the outlet port of the hydraulic motor 1 will allow the drain change-over valve 8 to be changed over momentarily to the right thus draining the pressurized fluid within the normal running fluid line 2. Further, at the same time, the fluid pressure is acted in the second pressure chamber 23b of the timer valve 9 thereby moving the spool 22 to the right. At the same time, the fluid in the first pressure chamber 23a is restricted by the restricted passage 32, and so the spool 22 begins to move slowly to the right.

Figure 7:
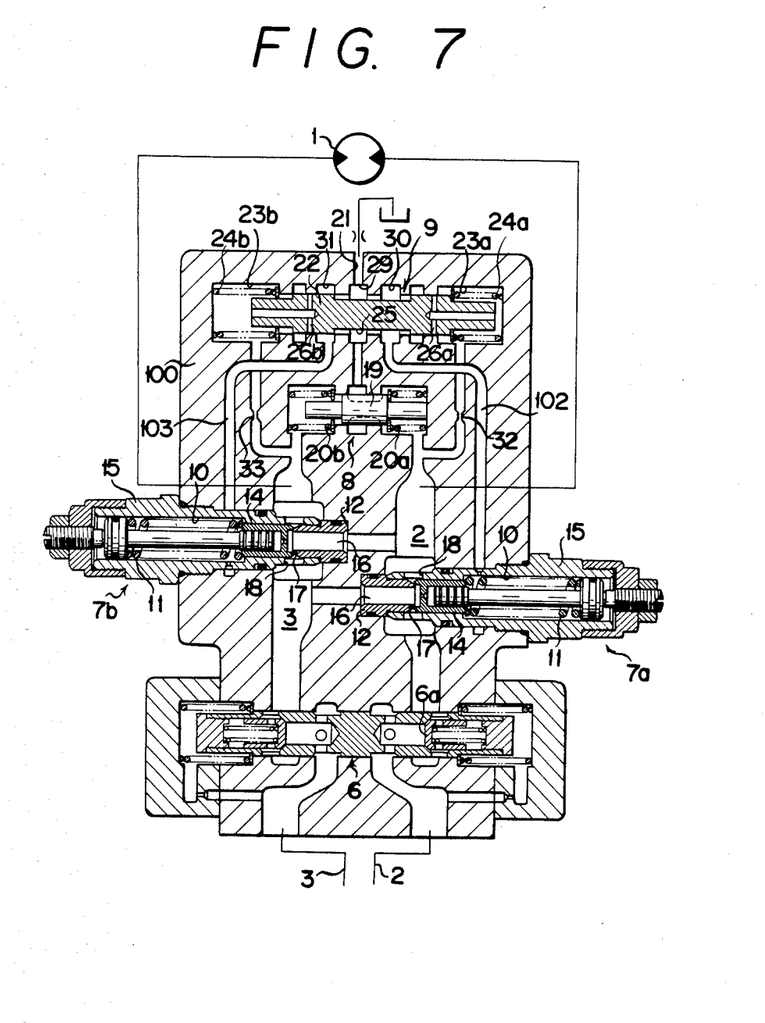

(5) UNDER BRAKING CONDITION—SET AT A LOW PRESSURE RELIEF CONDITION (FIG. 7):

When the spool 22 of the timer valve 9 begins to move to the right and during the movement, the fluid in the back pressure chamber 10 of the second relief valve 7b is drained through the timer valve 9 so that the second relief valve 7b may be set at a low pressure relief condition. Consequently, the pressurized fluid in the reverse running fluid line 3 which is acted on the pressure receiving face 17 of the poppet 14 is kept at a low pressure and drained into the normal running fluid line 2 through the axial bore 16 of the valve seat member 12. Whilst, at that time, the first relief valve 7a is set at a high pressure relief condition relative to the second relief valve 7b.

Figure 8:
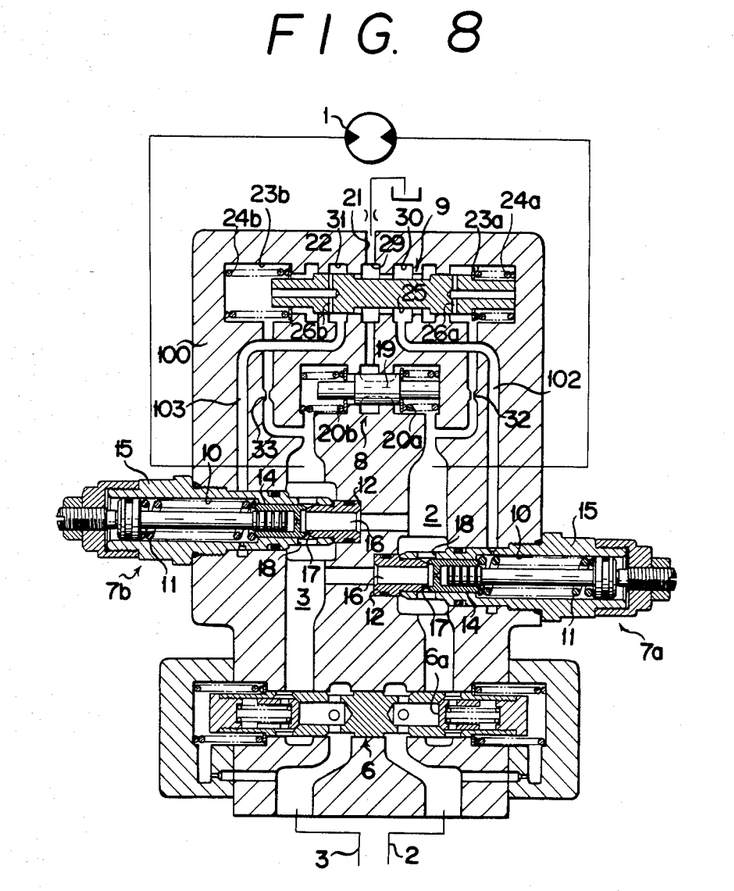

(6) UNDER BRAKING CONDITION—SET AT A HIGH PRESSURE RELIEF CONDITION (FIG. 8):

With the movement of the spool 22 of the timer valve 9 to its right stroke end, the braking pressure in the reverse running fluid line 3 is applied to the back pressure chamber 10 of the second relief valve 7b so that the relief valve 7b is blocked and ceases its function as a low pressure setting relief valve so as to allow the pressure in the reverse running fluid line 3 (or the outlet port of the hydraulic motor) to rise again.

When the braking fluid pressure in the reverse running fluid line 3 has reached a predetermined value, the first relief valve 7a is actuated and the braking pressure in the reverse running fluid line 3 is set at a high pressure to thereby develop a large braking torque to be applied to the hydraulic motor 1 and stop the latter.

Figure 9A:
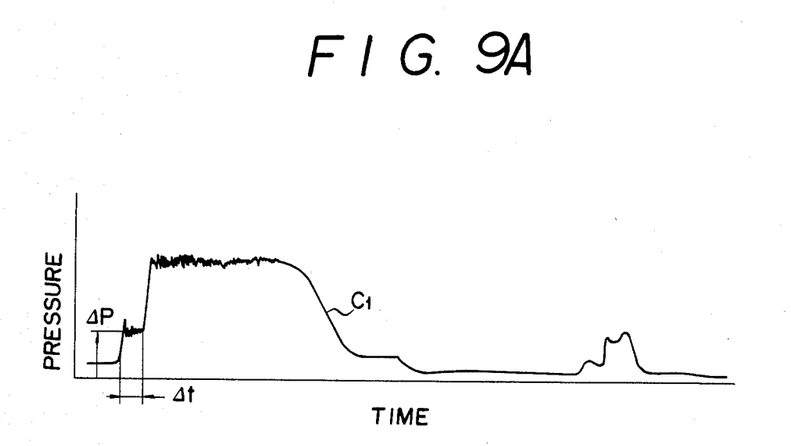
FIGS. 9A and 9B show fluid pressure waveforms in a driving fluid line and a braking fluid line, respectively of the circuit of the hydraulic brake valve system of the present invention.
Figure 9B:
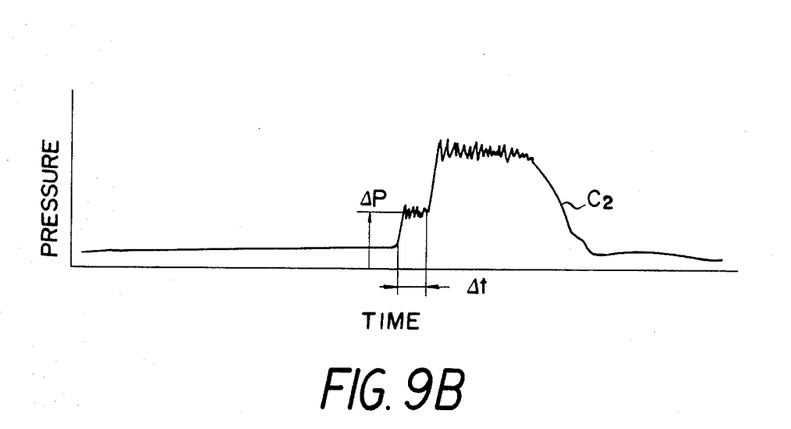

The changes in pressure within the normal running or driving fluid line 2 and those within the reverse running (or braking) fluid line 3 in the above-mentioned operation are as shown in FIGS. 9A and 9B. The pressure in the normal running fluid line 2 in the initial driving and acceleration stage is set at a low pressure $\Delta P$ as shown by a line $C_1$ over the period of time of $\Delta t$ required for moving the spool 22 of the timer valve 9. In the lapse of the time $\Delta t$, the fluid pressure is set at a high pressure and will increase in two stages. Further, the pressure in the reverse running or braking fluid line 3 when the brake is applied will increase in the same manner in two stages as shown by a line $C_2$.

In the above-mentioned embodiment, the pressure $\Delta P$ is in the range of 40 to 50 Kg/cm$^2$, whilst the period of time $\Delta t$ is in the order of 0.1 to 0.2 seconds.

It is to be understood that the foregoing description is merely illustrative of preferred embodiments of the invention, and that the scope of the invention is not to be limited thereto, but is to be determined by the scope of the appended claims.

What is claimed is:

1. A hydraulic brake valve system installed in a hydraulic fluid circuit wherein a hydraulic motor is connected with a manually operated directional control valve through a driving fluid line of the circuit and a braking fluid line, characterized in that said system comprises:

(a) a counterbalance valve connected between the driving fluid line and the braking fluid line and actuated by pressure differential between them;

(b) a first relief valve having two pressure receiving surfaces therearound for relieving the pressurized fluid acting on one of said pressure receiving surfaces at a low pressure and for relieving the pressurized fluid acting on the other of said pressure receiving surfaces at a high pressure, said first relief valve having a back pressure chamber to block the relieving operation which is arranged to connect the pressure receiving surface on the low pressure side with the driving fluid line and to connect the pressure receiving surface on the high pressure side with the braking fluid line;

(c) a second relief valve having the same construction as that of the first relief valve and arranged to connect the pressure receiving surface on the low pressure side with said braking fluid line and to connect the pressure receiving surface on the high pressure side with said driving fluid line;

said first and second relief valves each comprising a valve seat member having an axially extending bore communicating with a first port; a poppet having a diameter larger than that of the seat of said valve seat member thereby defining an inner diameter portion and an outside diameter portion, the inner diameter portion defining said one of said pressure receiving surface, the end face of the outside diameter portion of said poppet being located oppositely to a second port and defining the other of said pressure receiving surfaces; and a spring located to urge said poppet from the rear surface thereof towards said valve seat member, the arrangement being made such that if the area of the poppet to receive the pressurized fluid from the first port is defined as $A_1$ and that of the poppet to receive the pressurized fluid from the second port as $A_2$, then a relationship of $A_1 < A_2$ is obtained; the rear surface of said poppet facing said back pressure chamber and being located oppositely to a third port;

(d) a drain change-over valve means actuated by the pressure differential between the driving fluid line and the braking fluid line for connecting either one of said fluid lines which is kept at a low pressure with a drain passage; and (e) timer valve means actuated by the pressure differential between the driving fluid line and the braking fluid line for supplying with a time lag the pressurized fluid within either one of said fluid lines which is kept at a high pressure into the back pressure chamber of the relief valve whose pressure receiving surface on the low pressure side is connected with said fluid line kept at a high pressure.

2. A hydraulic brake valve system as claimed in claim 1, characterized in that said two relief valves constitute a cross-over safety valve in which the first port of one of said relief valves is connected with said driving fluid line and the second port thereof is connected with said braking fluid line, whilst, the first port of the other relief valve is connected with said braking fluid line and the second port thereof is connected with said driving fluid line.

* * * * *